(12) United States Patent
Biswas et al.

(10) Patent No.: US 10,069,867 B2
(45) Date of Patent: Sep. 4, 2018

(54) METHOD AND APPARATUS FOR DETERMINING PRIVACY POLICY FOR DEVICES BASED ON BRAIN WAVE INFORMATION

(71) Applicant: Nokia Corporation, Espoo (FI)

(72) Inventors: Debmalya Biswas, Lausanne (CH); Matthew John Lawrenson, Bussigny-pres-de-lausanne (CH); Julian Nolan, Pully (CH)

(73) Assignee: Nokia Technologies Oy, Espoo (FI)

( * ) Notice: Subject to any disclaimer, the term of this patent is extended or adjusted under 35 U.S.C. 154(b) by 123 days.

(21) Appl. No.: 14/093,217

(22) Filed: Nov. 29, 2013

(65) Prior Publication Data
US 2015/0156217 A1 Jun. 4, 2015

(51) Int. Cl.
*G06F 21/00* (2013.01)
*H04L 29/06* (2006.01)
*G06F 3/01* (2006.01)
*H04W 12/02* (2009.01)

(52) U.S. Cl.
CPC .............. *H04L 63/20* (2013.01); *G06F 3/015* (2013.01); *H04W 12/02* (2013.01)

(58) Field of Classification Search
CPC ...................................................... H04L 63/20
See application file for complete search history.

(56) References Cited

U.S. PATENT DOCUMENTS 8,005,766 B2    8/2011  Tian et al.
9,211,078 B2 *  12/2015 Meggiolaro ........... A61B 5/048
2007/0245409 A1* 10/2007 Harris et al. ........................ 726/5
2009/0165145 A1*  6/2009 Haapsaari et al. ............... 726/28
2012/0192247 A1*  7/2012 Oliver et al. ....................... 726/1
2012/0222083 A1*  8/2012 Vaha-Sipila et al. ............. 726/1
2013/0081099 A1*  3/2013 Sathish et al. ..................... 726/1
2013/0166726 A1*  6/2013 Boldyrev ............... G06Q 50/01
                                                              709/224
2013/0174211 A1*  7/2013 Aad ..................... G06F 21/604
                                                                726/1
(Continued)

FOREIGN PATENT DOCUMENTS

AU    2012100172 A4    3/2012
WO    2009081266 A1    7/2009
WO    2013017985 A1    2/2013

OTHER PUBLICATIONS

Bissett et al., "The Social Impact of Social Computing," ETHICOMP 2011, Proceedings of the Twelth International Conference, Sheffield Hallam University, Sheffield, UK, dated Sep. 14 to 16, 2011, 11 pages.

*Primary Examiner* — Jeffrey C Pwu
*Assistant Examiner* — William A Corum, Jr.
(74) *Attorney, Agent, or Firm* — Ditthavong & Steiner, P.C.

(57) ABSTRACT

An approach is provided for processing sensor data to determine an identification of at least one object. The approach involves determining brain wave data associated with at least one user during an exposure of the at least one object to at least one user. The approach also involves processing the brain wave information to determine a sensitivity information of the at least one user to the at least one object. The approach further involves causing a configuration of one or more privacy policies of at least one device based, at least in part, on the sensitivity information.

10 Claims, 13 Drawing Sheets

(56) References Cited

U.S. PATENT DOCUMENTS

| | | | | |
|---|---|---|---|---|
| 2013/0263206 | A1* | 10/2013 | Nefedov et al. | 726/1 |
| 2014/0228701 | A1* | 8/2014 | Chizeck | A61B 5/04012 600/544 |
| 2015/0156217 | A1* | 6/2015 | Biswas | H04L 63/20 726/1 |
| 2015/0199010 | A1* | 7/2015 | Coleman | A61B 5/0006 345/156 |
| 2015/0351655 | A1* | 12/2015 | Coleman | A61B 5/0482 600/301 |
| 2016/0103487 | A1* | 4/2016 | Crawford | G06F 3/015 600/544 |

\* cited by examiner

METHOD AND APPARATUS FOR DETERMINING PRIVACY POLICY FOR DEVICES BASED ON BRAIN WAVE INFORMATION

BACKGROUND

With the advancement in technology, mobile devices are capable of collecting real-time information on the activities of their users. Though user interaction with the applications executing on the at least one mobile device are becoming increasingly ubiquitous, the privacy concerns associated with such interaction often restrict a user's willingness to share data. Due to privacy concerns, users often set privacy policies to restrict data sharing with one or more applications. Currently, the users may manually set privacy policies to restrict data sharing. Needless to mention, the process of manual configuration of privacy policies are cumbersome and time consuming, and is not reflective of the changes in the user's context or situation. As a result, users are left vulnerable to privacy threats.

SOME EXAMPLE EMBODIMENTS

Therefore, there is a need for an approach for processing the brain wave information associated with at least one user to determine sensitivity information for one or more objects around at least one user's environment to configure one or more privacy policies.

According to one embodiment, a method comprises processing and/or facilitating a processing of sensor data to determine an identification of at least one object. The method also comprises determining brain wave data associated with at least one user during an exposure of the at least one object to at least one user. The method further comprises processing and/or facilitating a processing of the brain wave information to determine a sensitivity information of the at least one user to the at least one object. The method also comprises causing, at least in part, a configuration of one or more privacy policies of at least one device based, at least in part, on the sensitivity information.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of sensor data to determine an identification of at least one object. The apparatus is also caused to determine brain wave data associated with at least one user during an exposure of the at least one object to at least one user. The apparatus is further caused to process and/or facilitate a processing of the brain wave information to determine a sensitivity information of the at least one user to the at least one object. The apparatus is also caused to cause, at least in part, a configuration of one or more privacy policies of at least one device based, at least in part, on the sensitivity information.

According to another embodiment, a computer-readable storage medium carries one or more sequences of one or more instructions which, when executed by one or more processors, cause, at least in part, an apparatus to process and/or facilitate a processing of sensor data to determine an identification of at least one object. The apparatus is also caused to determine brain wave data associated with at least one user during an exposure of the at least one object to at least one user. The apparatus is further caused to process and/or facilitate a processing of the brain wave information to determine a sensitivity information of the at least one user to the at least one object. The apparatus is also caused to caused, at least in part, a configuration of one or more privacy policies of at least one device based, at least in part, on the sensitivity information.

According to another embodiment, an apparatus comprises means for processing and/or facilitating a processing of sensor data to determine an identification of at least one object. The apparatus also comprises means for determining brain wave data associated with at least one user during an exposure of the at least one object to at least one user. The apparatus further comprises means for processing and/or facilitating a processing of the brain wave information to determine a sensitivity information of the at least one user to the at least one object. The apparatus also comprises means for causing, at least in part, a configuration of one or more privacy policies of at least one device based, at least in part, on the sensitivity information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for processing the brain wave information associated with at least one user to determine sensitivity information for one or more objects around at least one user's environment to configure one or more privacy policies are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As data intensive services become more prevalent, users are increasingly reliant on network and data accessibility or sharing. However, users often limit data sharing due to privacy concerns. The concerns are often balanced with a user's need to access an associated service or benefits derived from the service. For example, a user may weigh the benefits versus the privacy concerns. At present, smartphones are capable of collecting extremely personal real-time information about their users (for instance, location information, activity information etc.) with the help of sensors embedded in the phones. While this information can be, and is indeed, used to provide very useful and context-relevant services to the users, it can also be misused with grave privacy implications. Unfortunately, cases of such misuse have been steadily rising (for example, the number of malware applications on one or more smartphones) not only in numbers, but also in their complexity and seriousness. To alleviate such privacy issues, the mobile platforms allow users to specify privacy policies, thereby restricting the actions that can be performed by one or more applications executing on at least one mobile device, and the types of information that can be collected by the one or more applications. Unfortunately, the current privacy policies definition process is very cumbersome and time consuming, thereby leading to users often neglecting to set their policies. This leaves the users vulnerable to privacy threats. For example, to ensure effective enforcement of one or more privacy policies multiple parameters with respect to data types and/or actions need to be specified for each application executing on at least one mobile device. This requires one or more users to classify their data, identifying the sensitive types, and those that need to be protected from an application based on its capabilities and/or trustworthiness and/or functionality.

Figure 1:
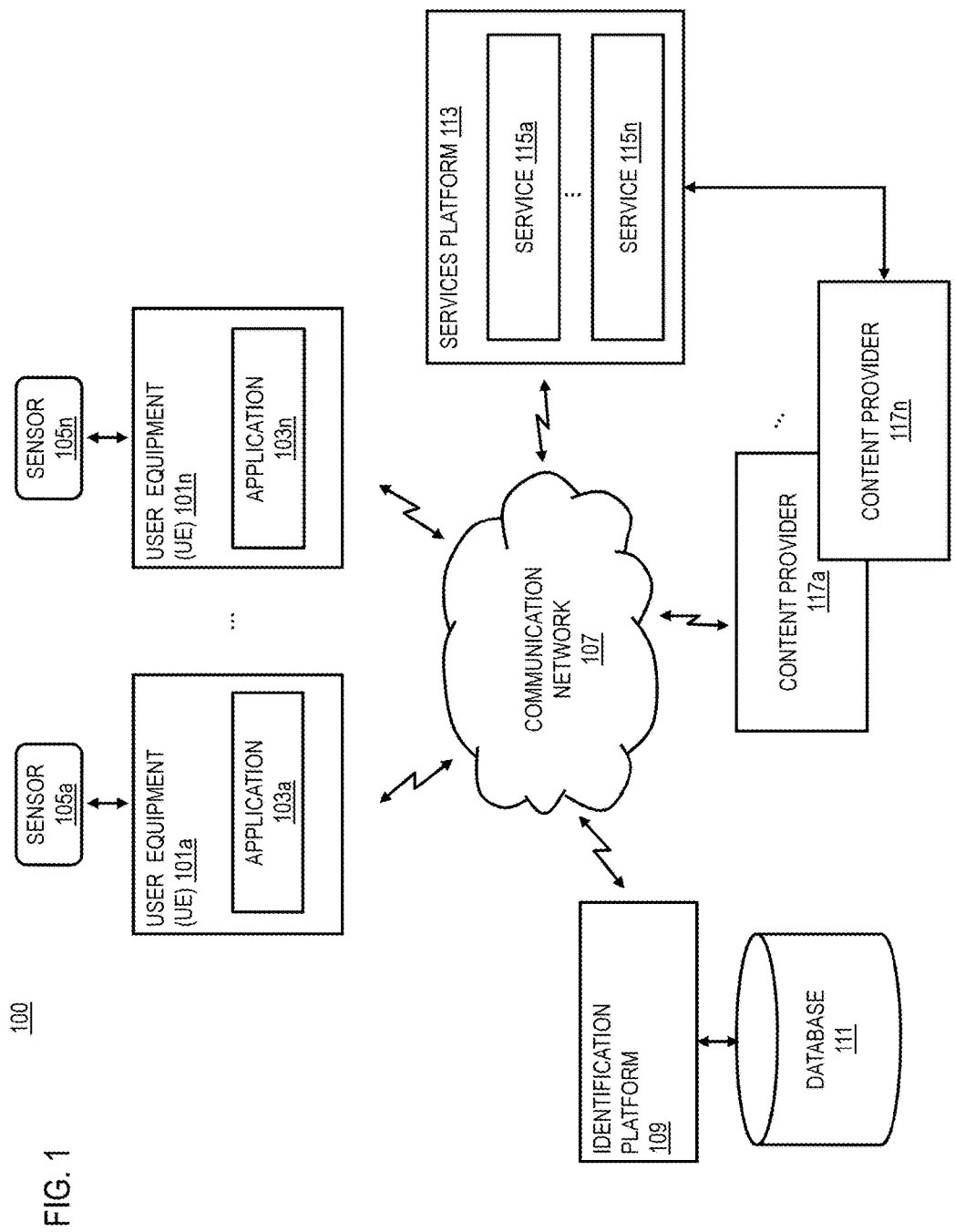
FIG. 1 is a diagram of a system capable of processing the brain wave information associated with at least one user to determine sensitivity information for one or more objects around at least one user's environment to configure one or more privacy policies, according to one embodiment.

To address this problem, a system 100 of FIG. 1 introduces the capability to process the brain wave information associated with at least one user to determine sensitivity information for one or more objects around at least one user's environment to configure one or more privacy policies. As shown in FIG. 1, the system 100 comprises user equipment (UEs) 101a-101n (collectively referred to as UE 101) that may include or be associated with applications 103a-103n (collectively referred to as applications 103) and sensors 105a-105n (collectively referred to as sensors 105). In one embodiment, the UE 101 have connectivity to the identification platform 109 via the communication network 107. In one embodiment, the identification platform 109 performs one or more functions associated with the enforcement of protective actions for one or more identified objects based, at least in part, on privacy policy.

System 100 of FIG. 1 introduces the capability of identifying fine grained objects of interest which are sensitive for the at least one user. In one scenario, system 100 identifies points of Interest (POI) that is sensitive for the at least one user, rather than identifying location as a generic high level user information that needs protection. Similarly, system 100 identifies specific pictures and/or contacts that are more privacy sensitive for the at least one user, and may define stronger policies to protect such information rather than setting a generic content sharing policy. As can be expected, such fine grained points of sensitive information are voluminous, hence difficult to capture. Needless to mention, manual recollection exercise runs the risk of omitting important pieces of information. As a result, system 100 uses Brain computer Interface (hereinafter BCI) as an enabler to identify sensitive information for the at least one user, to protect them from being accessed by one or more applications running on a user's mobile device. In one embodiment, a BCI technology may process brain wave signals to identify objects sensitive to at least one user. The gathered sensitivity information may then be used as an input to generate fine grained privacy policies for at least one user.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the applications 103 may be any type of application that is executable at the UE 101, such as, media applications (e.g., music and/or video streaming, photo exchange, etc.), social networking applications, content provisioning services, location-based services (e.g., providing proximity information), an internet browser, and the like. In another embodiment, the applications 103 at the UE 101 may be a BCI enabled application that captures brain wave signals emitted by at least one user when he/she encounters a sensitive object. In a further embodiment, the applications 103 may serve as the means by which the UE 101 and the identification platform 109 interacts. For example, the applications 103 may activate upon user request or upon prompting from the identification platform 109 that a BCI based P300 signal change is detected for the at least one user. For example, the applications 103 may act as the intermediary through which identification platform 109 receives sensor information from a UE 101 and convey privacy policy modifications to the UE 101 back from platform 109.

By way of example, the sensors 105 may be any type of sensors. In certain embodiments, the sensors 105 may include, for example, a global positioning sensor for gathering location data, a network detection sensor for detecting wireless signals or network data, a camera/imaging sensor for gathering image data, and the like. In one embodiment, the sensors 105 may further include light sensors, tilt sensors, pressure sensors, audio sensors (e.g., microphone), or receivers for different short-range communications (e.g., Bluetooth, WiFi, etc.). In one scenario, the sensors 105 may receive BCI signals via Bluetooth or other short-range communications. The sensors 105 may provide the identification platform 109 with the received BCI signals. In a further embodiment, the sensors 105 may determine the current device context and may correlate the contextual information with the emitted brain signal captured by the BCI enabled mobile application for verification of the sensitivity level for user data information.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the identification platform 109 may be a platform with multiple interconnected components. The identification platform 109 may include multiple servers, intelligent networking devices, computing devices, components and corresponding software for processing the brain wave information associated with at least one user to determine sensitivity information for one or more objects around at least one user's environment to configure one or more privacy policies.

In one embodiment, the identification platform 109 processes and/or facilitates a processing of sensor data to determine an identification of at least one object. In one embodiment, the identification platform 109 may identify user data sensitive to the user via BCI signals. Subsequently, the identification platform 109 may determine that the at least one user would like to protect the data form one or more applications running on the UE 101. Then, the sensitive user data and the type of protective actions that need to be enforced for an identified sensitive user data are determined by the identification platform 109 based, at least in part, the processing of the BCI signals.

In one embodiment, the identification platform 109 determines brain wave data associated with at least one user during an exposure of the at least one object to at least one user. In one scenario, the BCI technology may monitor evoked brain signals, for instance the P300 wave elicited in the process of decision making, to determine the interaction between an external device and the user's brain. The determined brain signals are transferred to the identification platform 109, wherein the detected patterns and/or the differences in the emitted brain wave signals are analyzed to infer the user's thought process, emotional state, reaction to specific stimuli, or a combination thereof.

In one embodiment, the identification platform 109 processes and/or facilitates a processing of the brain wave information to determine a sensitivity information of the at least one user to the at least one object. In one embodiment, the identification platform 109 may aggregate source materials, wherein the identification platform 109 may collect user content in the form of contact lists and/or images and/or videos of their daily life activities over a period of time. A specific embodiment consists of designing an interactive game with the user specific content embedded in the game. In another embodiment, the identification platform 109 may monitor the brain signal response of at least one user when the gathered source materials are presented either within the game, or manually. In a further embodiment, the identification platform 109 may classify the response of the at least one user. In one scenario, the recorded responses of the at least one user are transferred to the at least one UE 101 via Bluetooth. Subsequently, the user responses are classified to detect locations, faces, contacts, numbers, etc. that might be sensitive to the user. Such classification can be based on the P300 responses that the user exhibits when his brain recognizes someone or something familiar. The signal strength can be used to infer the sensitivity level, for example, if the signal strength is high then it infers higher sensitivity level for one or more user content.

In one embodiment, the identification platform 109 causes, at least in part, a configuration of one or more privacy policies of at least one device based, at least in part, on the sensitivity information. In one embodiment, the identification platform 109 may define privacy policies whereby one or more applications executing on the at least one UE 101 are prevented from accessing the identified user sensitive data items. In another embodiment, the privacy policies may be defined in terms of their severity, for instance, the identification platform 109 may block access of one or more application running on at least one UE 101 completely if the sensitivity level for the user data is extremely high, or the identification platform 109 may allow access with reduced frequency if the sensitivity level for one or more user content is not high. In a further embodiment, the identification platform 109 may cross-reference the identified user sensitive data with the capabilities of the one or more application running on the at least one UE 101, to determine the relevancy for the one or more applications. The underlying logic is that there is no point in defining privacy policies to protect identified sensitive data types from certain applications if such data types cannot be accessed due to the limited capabilities or functionalities of such applications.

In one embodiment, the identification platform 109 may improve the accuracy of sensitivity detection by iterative process wherein the data processing method is repeated multiple times to improve the accuracy of inferred results. In another embodiment, the identification platform 109 may process semantic information of the objects in specific user data to determine the sensitivity level of the objects. In another embodiment, the identification platform 109 may integrate the other feedback mechanisms, for instance, the emotional state recognition systems, to improve the accuracy of user sensitiveness detection.

In one embodiment, the identification platform 109 may include or have access to the database 111 to access or store any kind of data associated with one or more UE 101. In another embodiment, the identification platform 109 may determine sensitivity level for one or more data, privacy policy for at least one user, etc., by comparing the one or more data with the one or more data stored in the database 111. The data stored in the database 111 may, for instance, be provided by the UE 101, the services platform 113, one or more services 115a-115n (herein after services 115), or one or more content providers 117a-117n (herein after content providers 117).

The services platform 113 may include any type of service. By way of example, the services platform 113 may include social networking services, content (e.g., audio, video, images, etc.) provisioning services, application services, storage services, contextual information determination services, location based services, information (e.g., weather, news, etc.) based services, etc. In one embodiment, the services platform 113 may interact with the UE 101, the identification platform 109 and the content providers 117 to supplement or aid in the processing of the content information. In another embodiment, the services platform 113 may provide the identification platform 109 with user preference information, contextual information etc., to assist the identification platform 109 in determining at least one action for one or more applications operating on the at least one UE 101.

By way of example, services 115 may be an online service that reflects interests and/or activities of users. In one scenario, the services 115 provide representations of each user (e.g., a profile), his/her social links, and a variety of additional information. The services 115 allow users to share activities information, contextual information, and interests within their individual networks, and provides for data portability. The services 115 may additionally assist in providing the identification platform 109 in determining sensitivity levels for one or more contents. In one embodiment, the services 115 may further assist the identification platform 109 in profile mapping to protect the privacy interest of the one or more users of the UE 101. In one embodiment, user privacy profiles may be specific to each service, for example, services 115 may deduce privacy profile settings based on user settings with similar or analogous services using the same data. For instance, one music-related service 115a may have access to all music downloaded by a user. Then, if the user engages another music-related service 115c, service 115c may not have access to all the music downloaded by the user. The accessibility of user data for one or more services may be determined based, at least in part, on their reliability and trustworthiness.

The content providers 117 may provide content to the UE 101, the identification platform 109, and the services 115 of the services platform 113. The content provided may be any type of content, such as textual content, audio content, video content, image content, etc. In one embodiment, the content providers 117 may provide content that may supplement content of the applications 103, the sensors 105, or a combination thereof. By way of example, the content providers 117 may provide content that may aid the identification platform 109 in determining suitable privacy preserving actions for user data based, at least in part, on their sensitivity level. In one embodiment, the content providers 117 may also store content associated with the UE 101, the identification platform 109, and the services 115 of the services platform 113. In another embodiment, the content providers 117 may manage access to a central repository of data, and offer a consistent, standard interface to user's data.

By way of example, the UE 101, the identification platform 109, the services platform 113, and the content providers 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
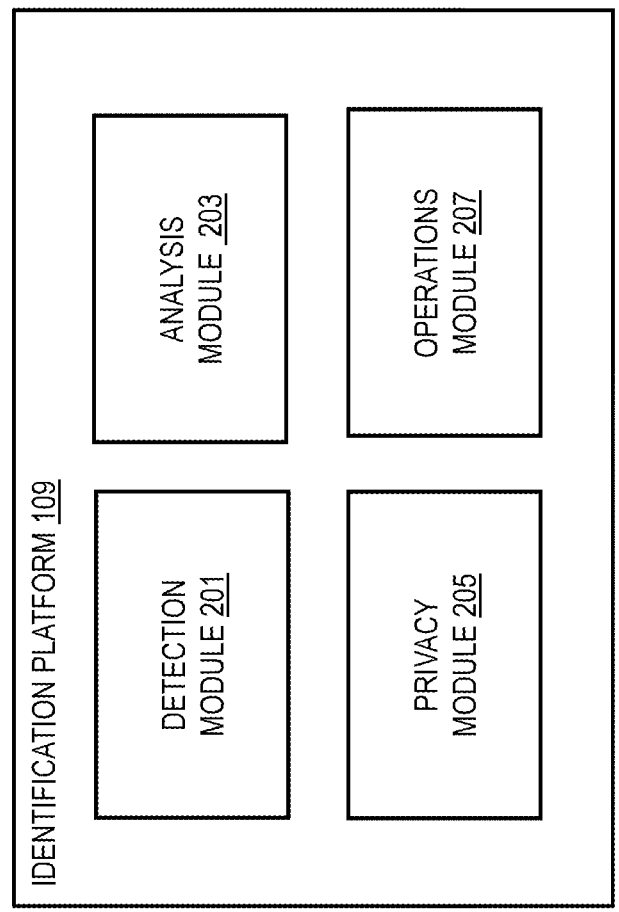
FIG. 2 is a diagram of the components of the identification platform 109, according to one embodiment.

FIG. 2 is a diagram of the components of the identification platform 109, according to one embodiment. By way of example, the identification platform 109 includes one or more components for processing the brain wave information associated with at least one user to determine sensitivity information for one or more objects around at least one user's environment to configure one or more privacy policies, according to one embodiment. It is contemplated that the functions of these components may be combined in one or more components or performed by other components of equivalent functionality. In this embodiment, the identification platform 109 includes a detection module 201, an analysis module 203, a privacy module 205, and an operations module 207.

In one embodiment, the detection module 201 may detect brain wave information that may indicate the thought process of at least one user to one or more objects in his/her surroundings. For example, the detection module 201 may determine that a brain signal above a certain threshold may indicate higher sensitivity level with respect to the viewed object. In another embodiment, the detection module 201 may perceive various patterns in the emitted brain wave signals to infer user's reaction to one or more objects, such reaction is then incorporated in the configuration of the one or more privacy policies for at least one UE 101. In a further embodiment, the detection module 201 may group the determined brain wave sensor information that may indicate various emotional reactions to one or more objects around the surrounding of the at least one user. In another embodiment, the detection module 201 may also determine contextual and/or activity information for at least one user because different users may experience different emotions to one or more objects based, at least in part, on their contextual and/or activity information.

In one embodiment, the analysis module 203 may determine sensitivity levels for one or more objects by processing the brain wave information detected by the detection module 201 for configuring one or more privacy policies for at least one UE 101. In another embodiment, the analysis module 203 may determine the sensitivity levels for one or more objects based, at least in part, on the sensitiveness of the object to at least one user and/or the privacy impact on the at least one user upon disclosure of the identified object based, at least in part, on the BCI based P300 signal response of the at least one user. In a further embodiment, the analysis module 203 may identify various emotional states for at least one user based, at least in part, on the BCI based P300 signal response. In one scenario, the analysis module 203 identifying various emotional states may involve determining stress level for at least one user during an exposure of the at least one object to the user.

In one embodiment, the privacy module 205 may determine privacy policy for at least one device based, at least in part, on sensitivity levels for one or more objects. The sensitivity level for one or more objects may be determined based, at least in part, on the brain wave information for at least one user. In one scenario, the privacy module 205 may process the stress level determined by the analysis module 203 to determine sensitivity level, wherein the privacy module 205 may determine that higher the stress level, higher the sensitiveness of the information. In another embodiment, the privacy module 205 may cause, at least in part, a determination of one or more parameters based, at least in part, on privacy requirements for one or more identified objects. In a further embodiment, the privacy module 205 may cause, at least in part, an enforcement of protective actions for identified object data based, at least in part, on one or more parameters determined by the privacy module 205. In one scenario, one or more protective actions may include, a blocking and/or allowing limited accessibility to at least one application executing on at least one device. In a further embodiment, the privacy module 205 may cause a mapping of one or more tasks being performed by at least one user to the BCI based P300 signal response during configuration of one or more privacy policies.

In one embodiment, the operations module 207 may cause a mapping of various identified data types associated with the at least one UE 101, and the sensitivity levels of the identified data types. In another embodiment, the operations module 207 may quantify the sensitiveness of the one or more identified data types to the user of the at least one UE 101, thereby enforcing the privacy preserving measures. In a further embodiment, the operations module 207 may determine the user data involved and/or the user reaction on the data involved to cause a restriction on the one or more applications from performing certain actions.

The above presented modules and components of the identification platform 109 can be implemented in hardware, firmware, software, or a combination thereof. Though depicted as a separate entity in FIG. 1, it is contemplated that the identification platform 109 may be implemented for direct operation by respective UE 101. As such, the identification platform 109 may generate direct signal inputs by way of the operating system of the UE 101 for interacting with the applications 103. In another embodiment, one or more of the modules 201-207 may be implemented for operation by respective UEs, as an identification platform 109, or combination thereof. Still further, the identification platform 109 may be integrated for direct operation with services 115, such as in the form of a widget or applet, in accordance with an information and/or subscriber sharing arrangement. The various executions presented herein contemplate any and all arrangements and models.

Figure 3:
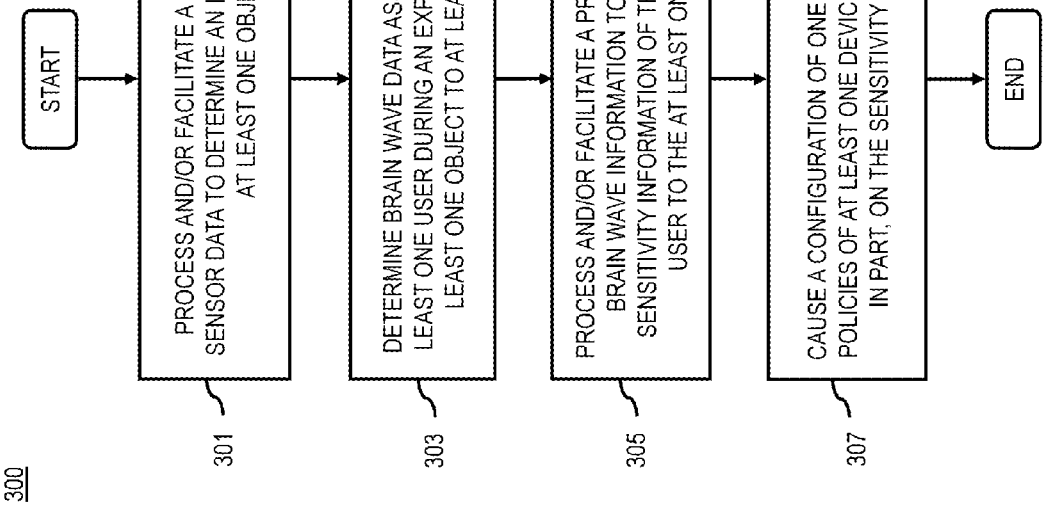
FIG. 3 is a flowchart of a process for processing the brain wave information associated with at least one user to determine sensitivity information for one or more objects around at least one user's environment to configure one or more privacy policies, according to one embodiment.
Figure 12:
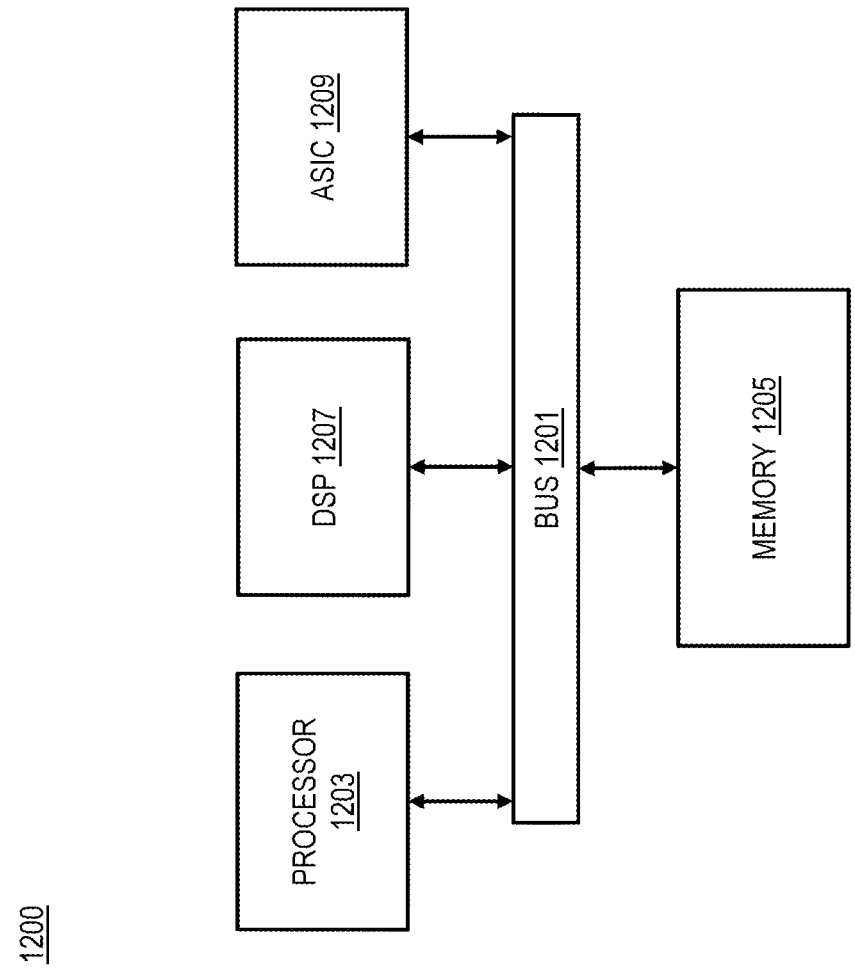
FIG. 12 is a diagram of a chip set that can be used to implement an embodiment of the invention.

FIG. 3 is a flowchart of a process for processing the brain wave information associated with at least one user to determine sensitivity information for one or more objects around at least one user's environment to configure one or more privacy policies, according to one embodiment. In one embodiment, the identification platform 109 performs the process 300 and is implemented in, for instance, a chip set including a processor and a memory as shown in FIG. 12.

In step 301, the identification platform 109 processes and/or facilitates a processing of sensor data to determine an identification of at least one object. In one scenario, with the multitude and complexity of data services, users are often uncertain as to the optimal amount of personal data to share with service providers. Currently, data shared as part of privacy policies may be static or unchanging with respect to a user's context or situation. The current option is for a user to manually adjust privacy settings with respect to his context or activities. Such adjustment may be unrealistic while a user is occupied with activities, even if the change may benefit the user's situation. As a result, the identification platform 109 may process the BCI based P300 response for at least one user to identify fine grained objects of interest for the at least one user. For example, user A may be visiting a hospital. The identification platform 109 may determine that user A's brain wave signal changed as he entered the hospital showing an increased level of emotional response. The BCI device attached to the user may detect and may map the electrical activity of his/her brain, for instance, when the user entered the hospital he/she elicits a specific neuronal signal known as P300. The change in user A's BCI response can be inferred as his/her desire to keep the hospital location and/or the medical tests undertaken at the hospital confidential, thereby restricting the sharing of those details. In one embodiment, the signal emitted by user A may be processed to determine the privacy policy for the at least one user activity, user data, point of interest, or a combination thereof.

In step 303, the identification platform 109 determines brain wave data associated with at least one user during an exposure of the at least one object to at least one user, wherein the brain wave data is determined using, at least in part, a brain computer interface. In one embodiment, the identification platform 109 determines sensitivity information for one or more objects for at least one user based, at least in part, on BCI signal of at least one user. In one scenario, user Z receives a confidential message from his/her colleague, the contents of the message needs to be kept private and must not be shared with any applications running on the at least one UE 101. The BCI enabled application on the at least one UE 101 detects the brain wave data, for instance, BCI based P300 signal response by user Z when he/she was exposed to the confidential message from his/her coworker. Subsequently, the identification platform 109 may configure privacy policy for the confidential message, wherein the one or more applications running on the at least one UE 101 is restricted from accessing the message. In one embodiment, the identification platform 109 may continue to impose such restriction on one or more applications for any future messages or data received from the specific coworker.

In step 305, the identification platform 109 processes and/or facilitates a processing of the brain wave information to determine a sensitivity information of the at least one user to the at least one object. In one embodiment, the identification platform 109 may determine privacy policy for one or more user data based, at least in part, on the sensitivity information determined from the processing of the brain wave information associated with the at least one user. In another embodiment, the identification platform 109 may determine privacy policy for one or more user data based, at least in part, on privacy policy attributes. In one scenario, the identification platform 109 may process the BCI based P300 signal response by user Z when he/she was exposed to the confidential message from his/her coworker. The identification platform 109 may determine a higher level of emotional reaction on the part of user Z signifying a need for privacy protection for the confidential message. In such manner, the identification platform 109 may infer the user's thought process, emotional state, reaction to specific stimuli, or a combination thereof, by processing the brain wave information for at least one user. In another scenario, the strength of the BCI based P300 signal can be used to infer the sensitivity level.

In step 307, the identification platform 109 causes, at least in part, a configuration of one or more privacy policies of at least one device based, at least in part, on the sensitivity information. In one embodiment, the identification platform 109 causes an enforcement of protective actions for specific user data based, at least in part, on the privacy policy. In one scenario, the identification platform 109 may process BCI based P300 signal to determine banks as a sensitive location information for at least one users, thereby the identification platform 109 may restrict the one or more actions that can be performed by applications executing on the at least one UE 101, and the types of information that can be collected by the such applications.

Figure 4:
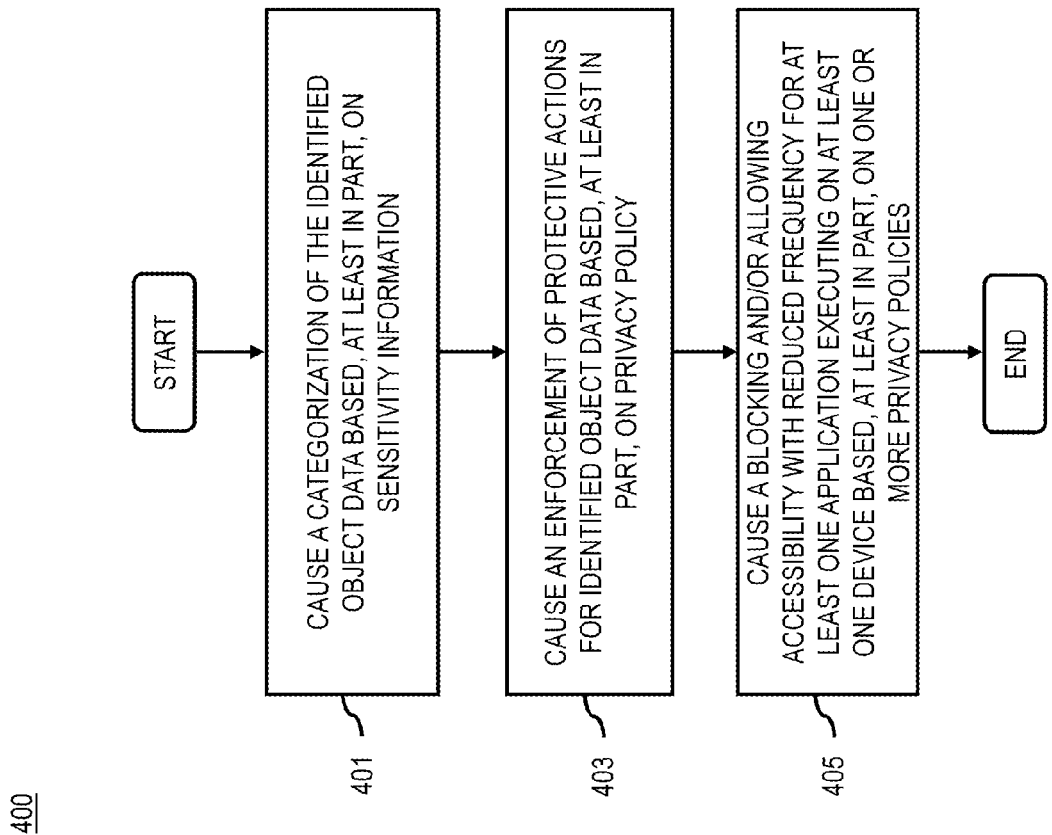
FIG. 4 is a flowchart of a process for causing categorization of the identified objects based, at least in part, on their sensitivity information to enforce one or more protective actions, according to one embodiment.

FIG. 4 is a flowchart of a process for causing categorization of the identified objects based, at least in part, on their sensitivity information to enforce one or more protective actions, according to one embodiment. In one embodiment, the identification platform 109 performs the process 400 and is implemented in, for instance, a chip set including a processor and a memory as shown in FIG. 12.

In step 401, the identification platform 109 causes, at least in part, a categorization of the identified object data based, at least in part, on sensitivity information. In one scenario, the identification platform 109 may process the response of the at least one user to one or more objects in their surroundings to categorize sensitive objects in a separate group from objects that are not required to be kept confidential. Such categorization can be based on P300 responses that the user exhibits when his/her brain recognizes someone or something familiar. In another scenario, the user responses are categorized to detect locations, contacts, images, videos, messages, etc., that are sensitive to the user.

In step 403, the identification platform 109 causes, at least in part, an enforcement of protective actions for identified object data based, at least in part, on privacy policy wherein one or more parameters for protective actions is based, at least in part, on application capabilities, application trustworthiness, application functionality or a combination thereof. As discussed earlier, one or more applications running on the at least one UE 101 has the capability of collecting very personal real-time information about their users, therefore there is a need to restrict one or more application from collecting user information based on their reliability. In one scenario, the identification platform 109 is of determination that the at least one location application conforms to the privacy policy of the UE 101 it is running on. Such location application may be given limited access to user's confidential location information based on its dependability. In another scenario, the identification platform 109 may not configure privacy policies to protect certain user data types from one or more applications because the one or more applications does not have the capability to access the data types.

In step 405, the identification platform 109 causes, at least in part, a blocking, allowing accessibility with reduced frequency, or a combination thereof for at least one application executing on at least one device based, at least in part, on one or more privacy policies. In one scenario, the identification platform 109 determines the relevancy of one or more applications executing on the at least one UE 101 with the user data types by cross referencing the capabilities of the one or more applications. Subsequently, the identification platform 109 upon determination that the one or more application can access the user data types may impose complete restriction or limited restriction based, at least in part, on the privacy policies.

Figure 5:
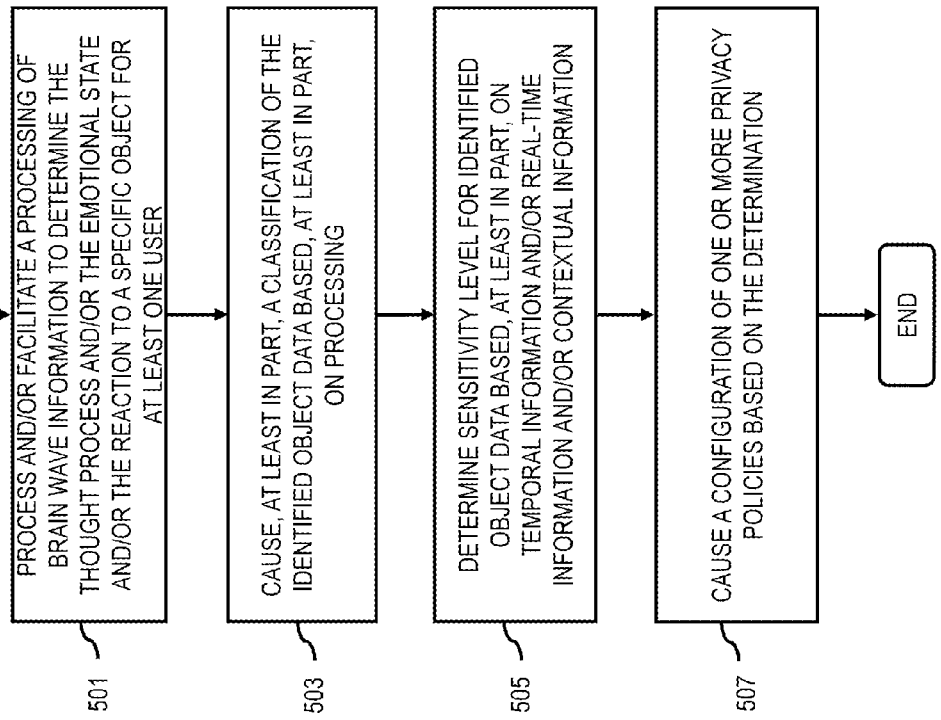
FIG. 5 is a flowchart of a process for causing classification of the identified object data and configuration of one or more privacy policy, according to one embodiment.

FIG. 5 is a flowchart of a process for causing classification of the identified object data and configuration of one or more privacy policy, according to one embodiment. In one embodiment, the identification platform 109 performs the process 500 and is implemented in, for instance, a chip set including a processor and a memory as shown in FIG. 12.

In step 501, the identification platform 109 processes and/or facilitates a processing of brain wave information to determine the thought process, the emotional state, the reaction to a specific object, or a combination thereof for at least one user. In one scenario, the identification platform 109 may identify information that is sensitive to the at least one user by determining their thinking process pertaining to one or more objects around them. The identification platform 109 may obtain information on the mental state for at least one user by processing their brain wave information and determine the data that needs to be protected from one or more applications running on the user's UE 101.

In step 503, the identification platform 109 causes, at least in part, a classification of the identified object data based, at least in part, on processing. In one scenario, the identification platform 109 may identify fine grained objects of interest that are sensitive for at least one user and defining stronger policies to protect them from one or more applications executing on the at least one UE 101. Needless to mention, such fine grained objects of interest for at least one user are numerous and requires proper organization. As a result, the identification platform 109 may classify the identified objects based, at least in part, on their sensitivity level. For instance, the user data that are extremely confidential and needs the highest protection from one or more applications may be classified in a separate group from those that does not need protection. In one scenario, such classification may support the identification platform 109 in prioritizing data for at least one user.

In step 505, the identification platform 109 determines sensitivity level for identified object data based, at least in part, on temporal information, real-time information, contextual information, or a combination thereof. In one scenario, the identification platform 109 may determine the duration of restrictions on one or more applications based on temporal information for at least one user data. For example, the identification platform 109 may restrict one or more location application from accessing the user's location information when he/she visits a bank, such restriction is levied for the duration the user visits the bank. In another scenario, the identification platform 109 monitors the BCI signal in real time via a BCI enabled application on a UE 101. The identification platform 109 may detect brain wave signals (or changes in brain wave signals) that correspond to the user encountering a sensitive object. Then, the identification platform 109 co-relates the brain wave signal with current contextual information of the at least one user. In one scenario, the contextual information includes location information, nearby people etc.

In step 507, the identification platform 109 causes, at least in part, a configuration of one or more privacy policies based on the determination. In one embodiment, one or more user recognitions may configure the privacy policies. In one scenario, BCI sensitivity focuses on the recognition of the objects by at least one user, for example, something a user is experiencing or causes a user to recognize. In another embodiment, the identification platform 109 may cause a categorization of the recognition based, at least in part, on the identified object or multiple objects, the sensor-type, the application type, the environmental attributes, or a combination thereof.

Figure 6:
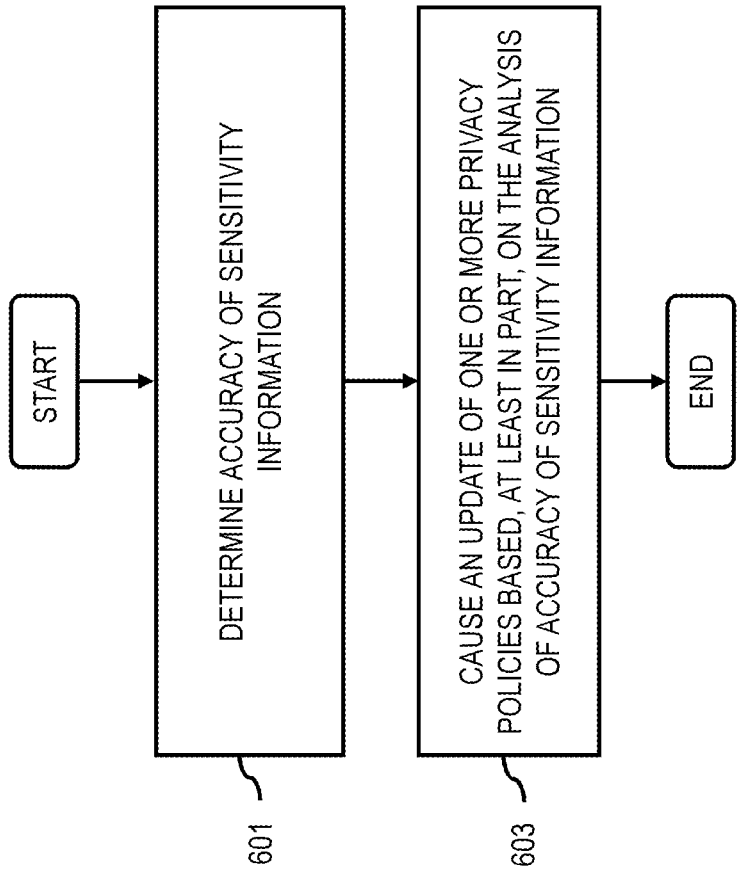
FIG. 6 is a flowchart of a process for determining accuracy of sensitivity information and causing an update of one or more privacy policies based, at least in part, on the accuracy determination, according to one embodiment.

FIG. 6 is a flowchart of a process for determining accuracy of sensitivity information and causing an update of one or more privacy policies based, at least in part, on the accuracy determination, according to one embodiment. In one embodiment, the identification platform 109 performs the process 600 and is implemented in, for instance, a chip set including a processor and a memory as shown in FIG. 12.

In step 601, the identification platform 109 determines accuracy of sensitivity information by causing, at least in part, multiple processing of identified object data, determining semantic information for identified object data, integrating emotional state recognition systems, or a combination thereof. In one scenario, the identification platform 109 may process one or more objects in a specific picture or video frame of at least one user to determine the sensitivity of the object. In one example embodiment, the identification platform 109 may process a picture of at least one user containing a public playground and a building, the information that the building is a hospital can be used to infer that it is actually the building (and not the public playground) that is sensitive for the user.

In step 603, the identification platform 109 causes, at least in part, an update of one or more privacy policies based, at least in part, on the analysis of accuracy of sensitivity information. In one scenario, the identification platform 109 may cause a modification of privacy policy for at least one device associated with at least one user based, at least in part, on the variation in the sensitivity information. In another scenario, an update of one or more privacy policies includes an enabling or a disabling of one or more privacy policies for at least one device. In one embodiment, the identification platform 109 may further determine the length of time for one or more modifications in a privacy policy. In one scenario, the identification platform 109 may cause an application of preventive actions at the at least one application executing on at least one device for the duration of the user activity.

Figure 7:
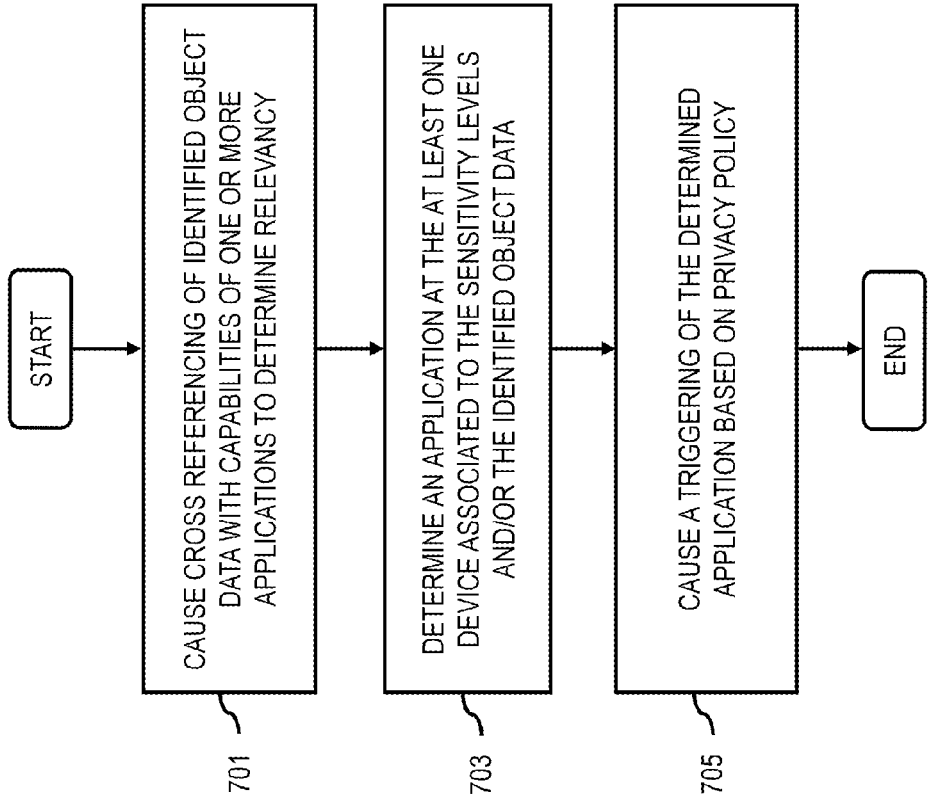
FIG. 7 is a flowchart of a process for triggering of at least one application based, at least in part, on relevancy information, according to one embodiment.

FIG. 7 is a flowchart of a process for triggering of at least one application based, at least in part, on relevancy information, according to one embodiment. In one embodiment, the identification platform 109 performs the process 700 and is implemented in, for instance, a chip set including a processor and a memory as shown in FIG. 12.

In step 701, the identification platform 109 causes, at least in part, cross referencing of identified object data with capabilities of one or more applications to determine relevancy of identified object data for one or more applications. In one scenario, the identification platform 109 causes a presentation of one or more objects to at least one user. Then, the identification platform 109 monitors the BCI signals emitted by the at least one user during the presentation to classify the response by the user. Such classification is based, at least in part, on the sensitivity information. Subsequently, the sensitivity information is used to configure one or more privacy policies. In another scenario, the identification platform 109 may determine the capability of the one or more applications to determine whether they can access certain data types during configuration of the privacy policy. The identification platform 109 acknowledges that there is no point in configuring privacy policies for data types that cannot be accessed by one or more applications.

In step 703, the identification platform 109 determines at least one application at the at least one device associated to the sensitivity levels, identified object data, or a combination thereof. In one embodiment, the identification platform 109 identifies the one or more applications executing on the at least one UE 101 that has the capability of accessing the one or identified object data. In another embodiment, the identification platform 109 ensure the one or more identified applications conforms to the privacy policies of the at least one UE 101. The selection of the one or more application and the limitation imposed on the one or more applications is based, at least in part, on the trustworthiness of the applications.

In step 705, the identification platform 109 causes, at least in part, a triggering of the determined application based, at least in part, on privacy policy.

Figure 8:
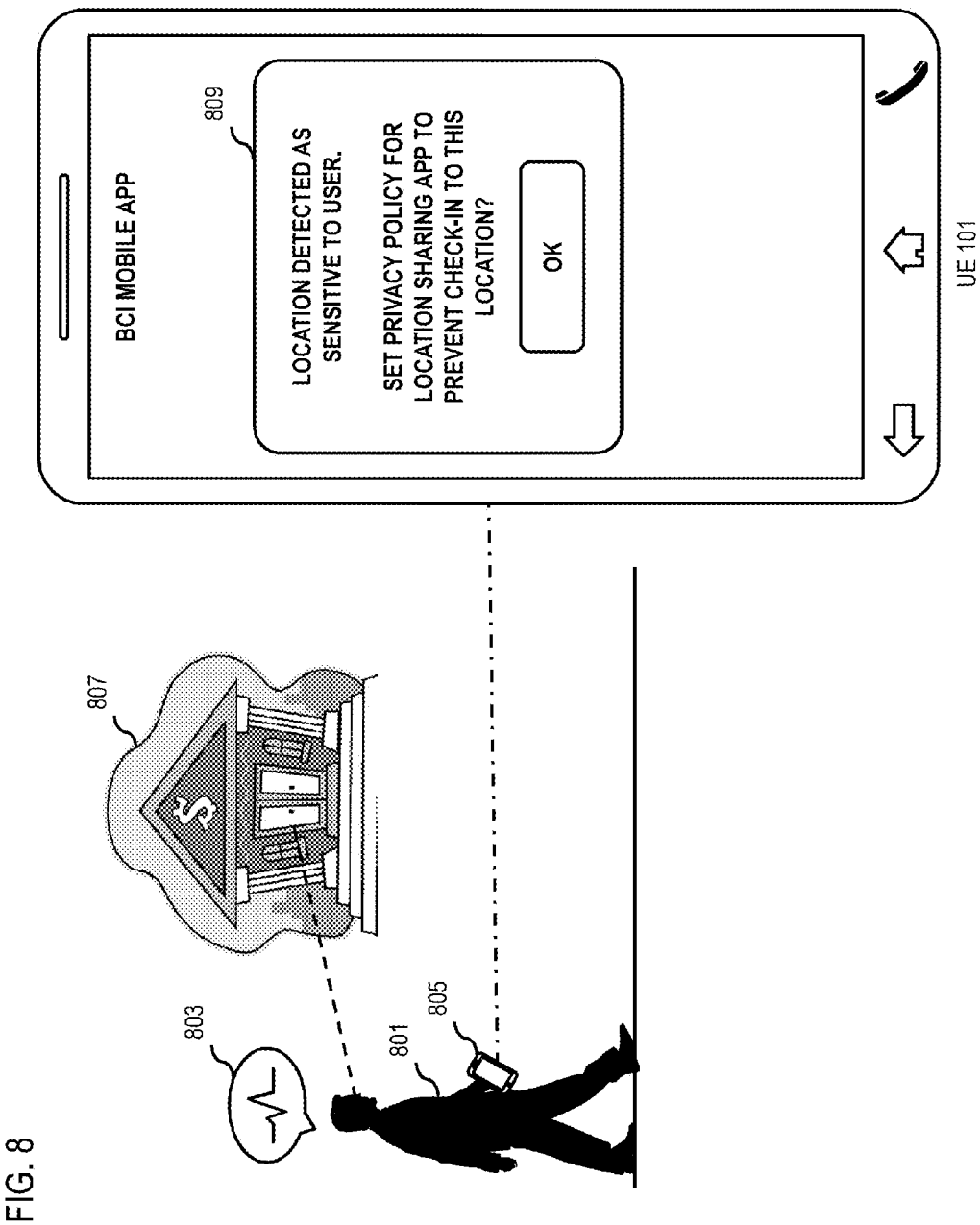
FIG. 8 is a diagram of a user interface utilized in processing the brain wave signals for at least one user to determine privacy policy for causing an enforcement of protective actions for identified object data, according to one example embodiment.

FIG. 8 is a diagram of a user interface utilized in processing the brain wave signals for at least one user to determine privacy policy for causing an enforcement of protective actions for identified object data, according to one example embodiment. In one scenario, user Z [801] while walking towards his office passes by his bank. This may lead to user Z's brain emitting a specific signal [803] that is classified as a signal emitted by user Z [801] when he/she encounters a sensitive object. The emitted signal is captured by his BCI enabled application executing on at least one UE 101 [805]. The at least one application correlates this information with his current context, to detect that user Z [801] was looking at a building [807], which happens to be a bank, when he emitted the signal. Subsequently, the identification platform 109 may identify the bank [807] as a sensitive location for the user Z [801], thereby setting a privacy policy [809] to prevent the location sharing application from running on the users' UE 101 at the time user Z visits the bank [807].

Figure 9:
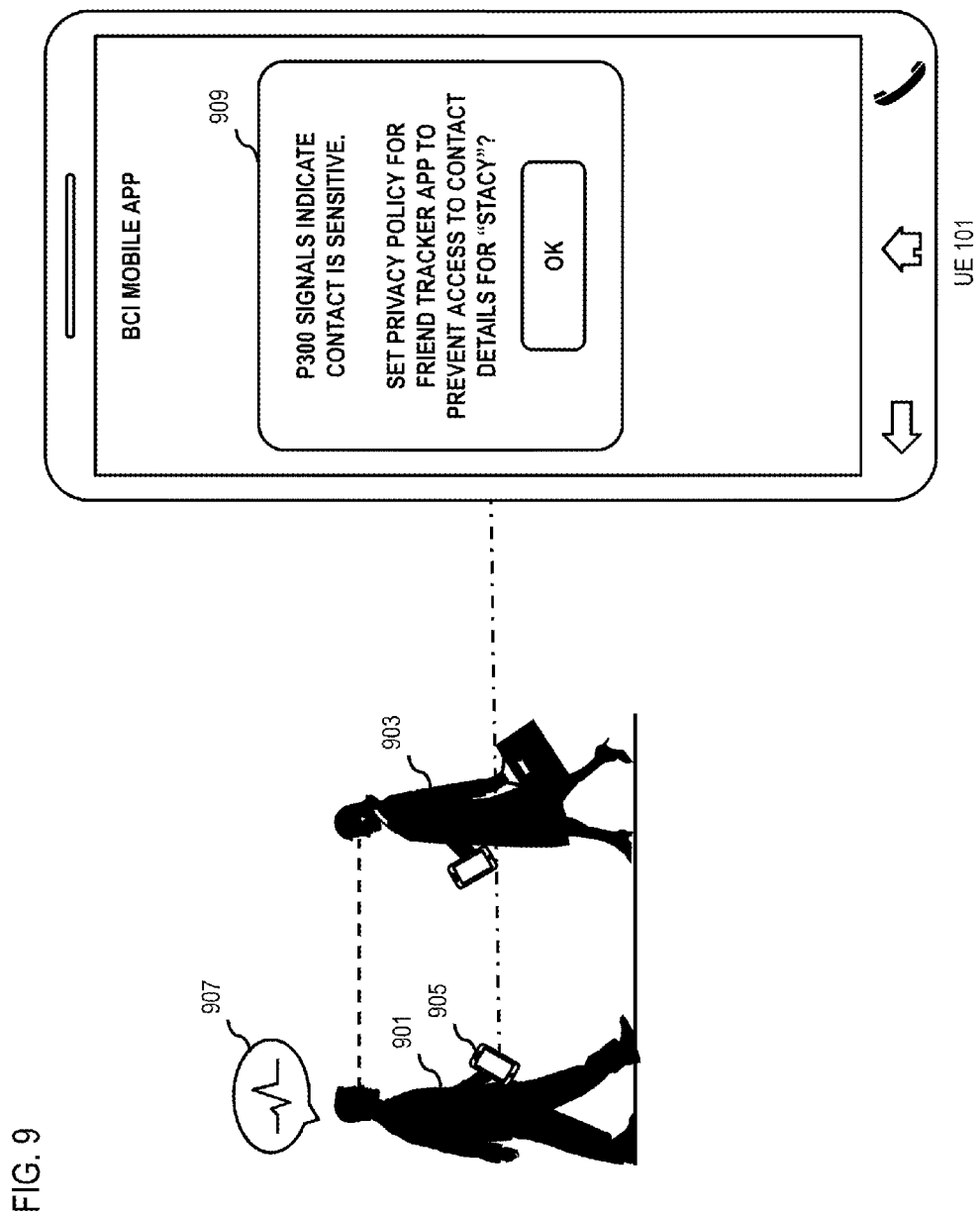
FIG. 9 is a diagram of a user interface utilized in the process of determining privacy policy based on sensitivity information and/or privacy policy attributes, according to one example embodiment.

FIG. 9 is a diagram of a user interface utilized in the process of determining privacy policy based on sensitivity information and/or privacy policy attributes, according to one example embodiment. In one scenario, user Z [901] encounters a sensitive contact user G [903], whose contact details including details of any meeting user Z [901] had with user G [903], needs to be kept private from the application executing on user Z's UE 101 [905]. In this scenario, the BCI enabled (privacy preserving) application in user Z's UE 101 [905] would detect the sensitivity of contact user G, based on user Z's P300 signals [907] on encountering user G. Accordingly, the identification platform 109 may set privacy policy [909] preventing user G's contacts and/or meeting details from being accessed by one or more applications installed on user Z's UE 101. In one embodiment, the identification platform 109 may cause simultaneous detection of multiple sensitive objects. In one scenario, the identification platform 109 may determine a contact to be sensitive for user Z [901] and user G [903] only if user Z [901] meets user G [903] in a specific location, for example, user Z's [901] BCI response changes as a result of meeting user G [903] in the Bank, but remains constant while meeting user G [903] in other environments. As a result, the identification platform 109 may determine two sensitive objects of interest for user Z [901], i.e., user 'G'[903] and the 'bank', which need to be protected as a group.

Figure 10:
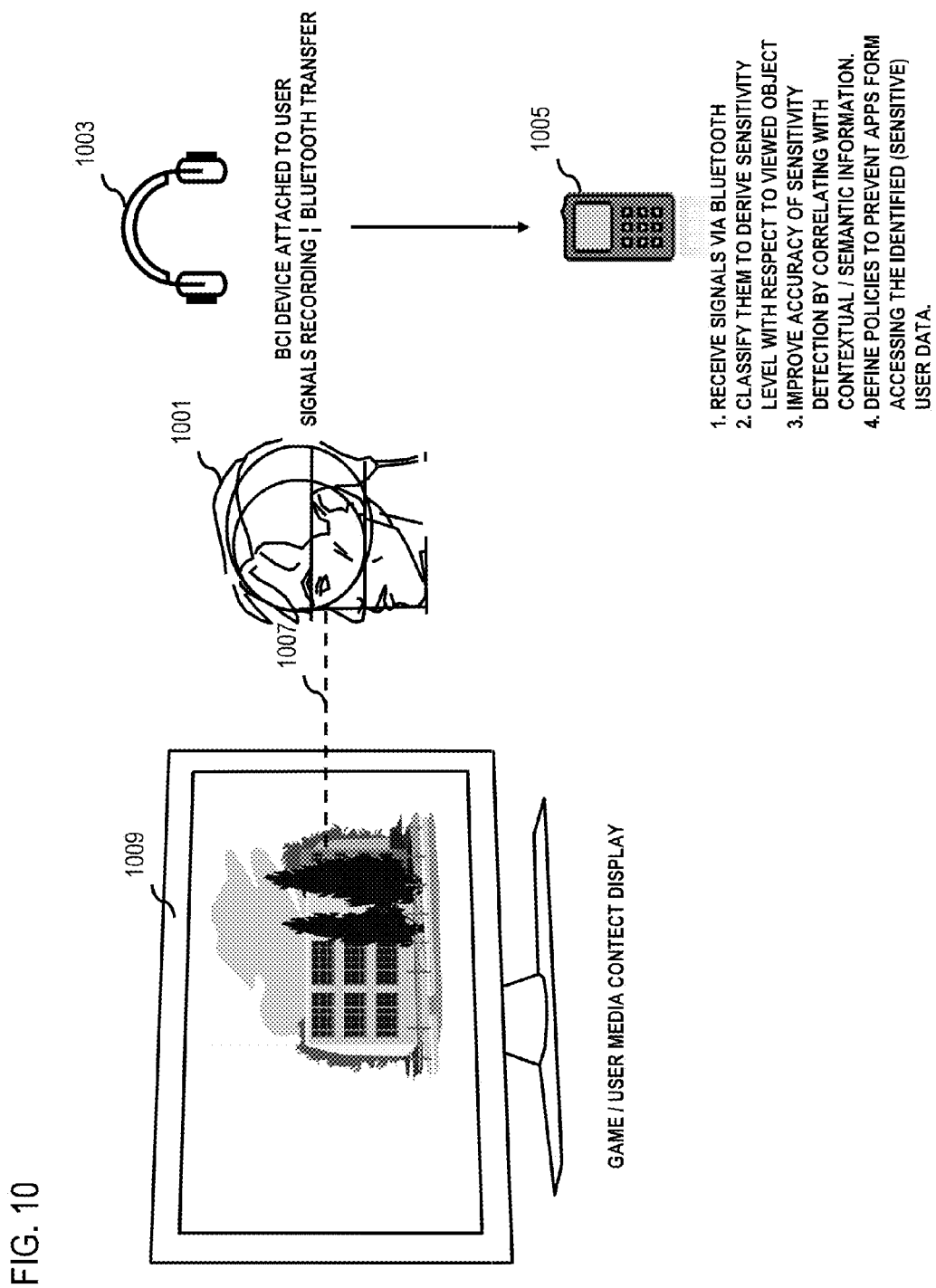
FIG. 10 is a diagram of a user interface that highlights a use-case where user data and/or BCI responses are analyzed in an offline fashion, according to one example embodiment.

FIG. 10 is a diagram of a user interface that highlights a use-case where user data and/or BCI responses are analyzed in an offline fashion, according to one example embodiment. In one scenario, the system consists of a user [1001] wearing a BCI device [1003] which communicates with the user's UE 101 via Bluetooth [1005]. Subsequently, the BCI enabled (privacy preserving) application on the user's UE 101 [1005] monitors the user's BCI signals in real-time to detect occurrences of signals (or changes in signals) that correspond to the user encountering a sensitive object [1007]. This is then correlated with the user's current context, in terms of his location, surrounding etc., to identify the sensitiveness of data to the at least one user. Then, the application may interact with the identification platform 109 to configure one or more privacy policies to prevent one or more applications on the UE 101 from accessing the identified (sensitive) user information. In another scenario, the identification platform 109 may classify the brain wave signal with respect to the viewed object [1009] to derive sensitivity information and may define privacy policy to prevent the one or more application in the at least one UE 101 from accessing the identified sensitive user information. In a further scenario, the identification platform 109 may improve accuracy of sensitivity detection by correlating the contextual information for at least one UE 101 with the semantic information. In one scenario, one of the preferred means of administering a BCI response in an offline mode may involve an interactive game with the user specific content embedded in the game. The specific user content in the game includes user contacts, images, videos, frequently visited sites etc. The one or more specific user content is then presented to the user to get his "sensitivity" response with regards to the presented objects. In one scenario, the identification platform 109 monitors the emitted brain signals when the specific user content is presented to the user through the game. Further, the game can be refined to focus on the object with respect to which the user has shown an initial level of sensitiveness.

The processes described herein for processing the brain wave information associated with at least one user to determine sensitivity information for one or more objects around at least one user's environment to configure one or more privacy policies may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 11:
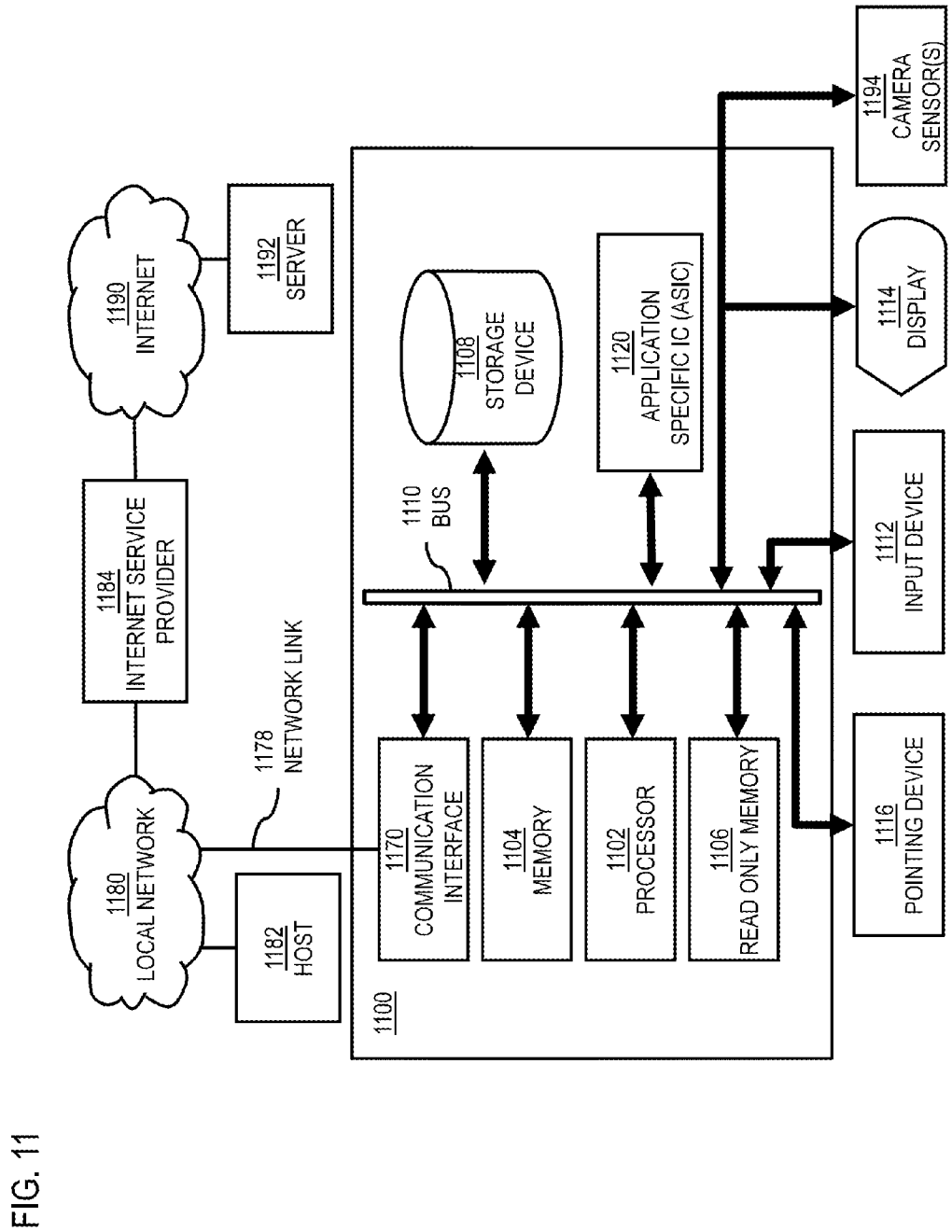
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to process the brain wave information associated with at least one user to determine sensitivity information for one or more objects around at least one user's environment to configure one or more privacy policies as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of processing the brain wave information associated with at least one user to determine sensitivity information for one or more objects around at least one user's environment to configure one or more privacy policies.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to process the brain wave information associated with at least one user to determine sensitivity information for one or more objects around at least one user's environment to configure one or more privacy policies. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1100 also includes a memory 1104 coupled to bus 1110. The memory 1104, such as a random access memory (RAM) or any other dynamic storage device, stores information including processor instructions for processing the brain wave information associated with at least one user to determine sensitivity information for one or more objects around at least one user's environment to configure one or more privacy policies. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or any other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for processing the brain wave information associated with at least one user to determine sensitivity information for one or more objects around at least one user's environment to configure one or more privacy policies, is provided to the bus 1110 for use by the processor from an external input device 1112, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT), a liquid crystal display (LCD), a light emitting diode (LED) display, an organic LED (OLED) display, a plasma screen, or a printer for presenting text or images, and a pointing device 1116, such as a mouse, a trackball, cursor direction keys, or a motion sensor, for controlling a position of a small cursor image presented on the display 1114 and issuing commands associated with graphical elements presented on the display 1114, and one or more camera sensors 1194 for capturing, recording and causing to store one or more still and/or moving images (e.g., videos, movies, etc.) which also may comprise audio recordings. In some embodiments, for example, in embodiments in which the computer system 1100 performs all functions automatically without human input, one or more of external input device 1112, display device 1114 and pointing device 1116 may be omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of ASICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 107 for processing the brain wave information associated with at least one user to determine sensitivity information for one or more objects around at least one user's environment to configure one or more privacy policies to the UE 101.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or any other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

FIG. 12 illustrates a chip set or chip 1200 upon which an embodiment of the invention may be implemented. Chip set 1200 is programmed to process the brain wave information associated with at least one user to determine sensitivity information for one or more objects around at least one user's environment to configure one or more privacy policies as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of functions. Chip set or chip 1200, or a portion thereof, constitutes a means for performing one or more steps of processing the brain wave information associated with at least one user to determine sensitivity information for one or more objects around at least one user's environment to configure one or more privacy policies.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to process the brain wave information associated with at least one user to determine sensitivity information for one or more objects around at least one user's environment to configure one or more privacy policies. The memory 1205 also stores the data associated with or generated by the execution of the inventive steps.

Figure 13:
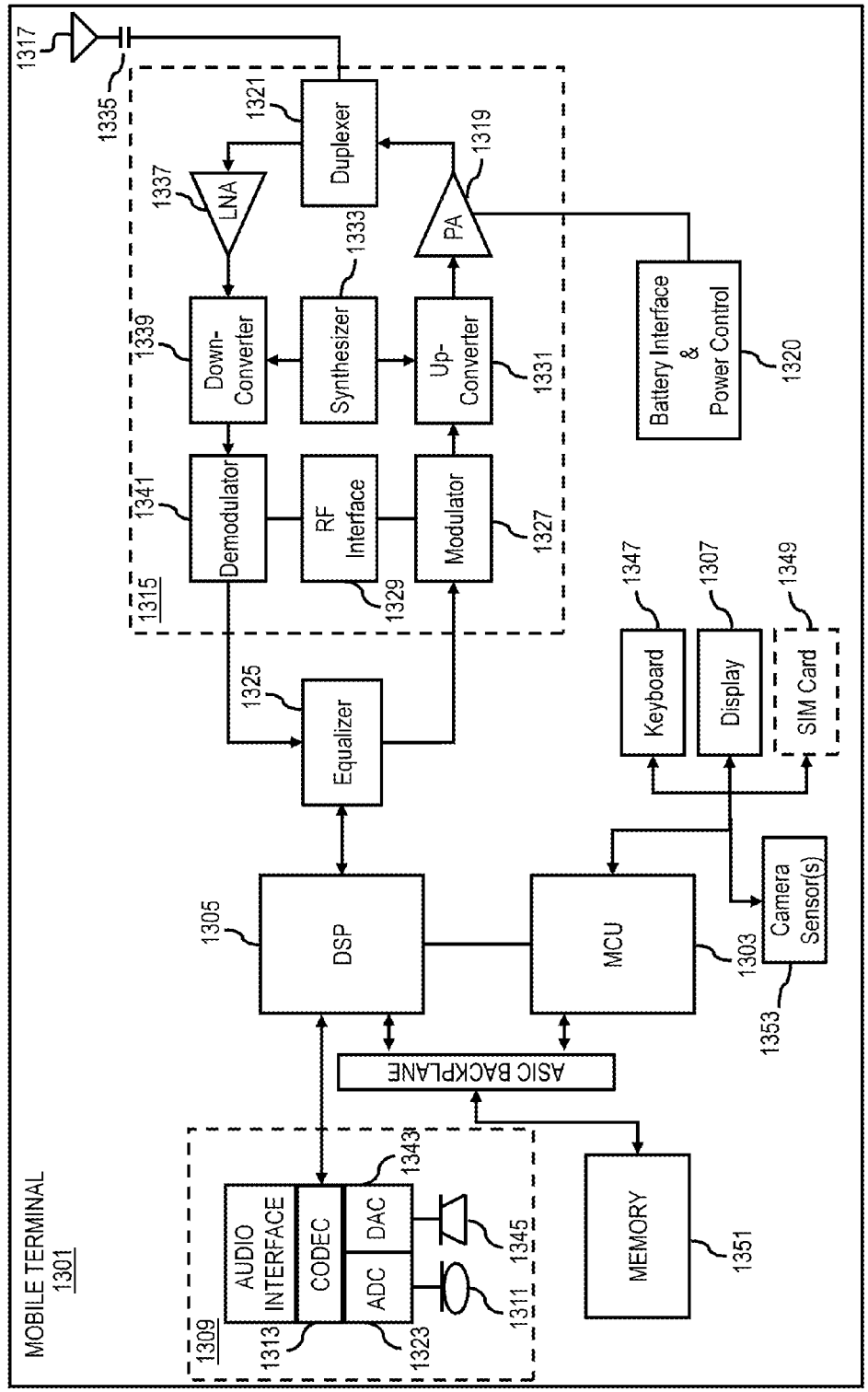
FIG. 13 is a diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1301, or a portion thereof, constitutes a means for performing one or more steps of processing the brain wave information associated with at least one user to determine sensitivity information for one or more objects around at least one user's environment to configure one or more privacy policies. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of processing the brain wave information associated with at least one user to determine sensitivity information for one or more objects around at least one user's environment to configure one or more privacy policies. The display 1307 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303 which can be implemented as a Central Processing Unit (CPU).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to process the brain wave information associated with at least one user to determine sensitivity information for one or more objects around at least one user's environment to configure one or more privacy policies. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

Further, one or more camera sensors 1353 may be incorporated onto the mobile station 1301 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    processing sensor data, at a user device, to determine an identification of at least one object;
    determining contextual information based on the sensor data, wherein the contextual information includes location of the user device;
    generating identified object data based on the identification of the at least one object;
    determining brain wave data associated with at least one user during an exposure of the at least one object to the at least one user, wherein the brain wave data is determined using, at least in part, a brain computer interface configured to communicate with the user device, the method further comprising: detecting that the one user is within a location that is sensitive based on the contextual information, wherein the sensitivity level is determined accordingly and the one or more privacy policies are configured to prevent sharing of the location;

correlating the contextual information with the brain wave data;

processing the brain wave data to determine sensitivity information of the at least one user to the at least one object, the sensitivity information selected from a combination of a thought process, an emotional state, and a reaction to a specific object of the at least one user;

categorizing the identified object data based, at least in part, on the sensitivity information;

cross-referencing the identified object data with capabilities of a plurality of applications to determine relevancy of the identified object data for the plurality of applications for selectively triggering one or more of the plurality of applications;

determining a sensitivity level based on the sensitivity information and on the correlation of the contextual information with the brain wave data;

configuring one or more privacy policies, which are applied to corresponding one or more of the plurality of applications, of the user device based, at least in part, on the sensitivity level; and enforcing protective actions for the identified object data based, at least in part, on at least one of the one or more privacy policies and the categorization of the identified object data, wherein one or more parameters for the protective actions is based, at least in part, on application capabilities, application trustworthiness, application functionality, or a combination thereof.

2. A method of claim 1, further comprising:

a blocking, allowing accessibility with reduced frequency, or a combination thereof for at least one application executing on at least one device based, at least in part, on the one or more privacy policies.

3. A method of claim 1, wherein the determination of the sensitivity level is further based, at least in part, on temporal information, real-time information, or a combination thereof.

4. A method of claim 1, further comprising:

determining an accuracy of the sensitivity information by causing, at least in part, multiple processing of the identified object data, determining semantic information associated with the identified object data, integrating emotional state recognition systems, or a combination thereof.

5. A method of claim 4, further comprising:

updating one or more privacy policies based, at least in part, on an analysis of the accuracy of sensitivity information.

6. An apparatus comprising:

at least one processor; and at least one memory including computer program code for one or more programs, the at least one memory and the computer program code configured to, with the at least one processor, cause the apparatus to perform at least the following, processing of sensor data to determine an identification of at least one object;

determine contextual information based on the sensor data, wherein the contextual information includes location of the user device;

generate identified object data based on the identification of the at least one object;

determine brain wave data associated with at least one user during an exposure of the at least one object to the at least one user, wherein the brain wave data is determined using, at least in part, a brain computer interface configured to communicate with the user device, wherein the apparatus is further caused to: detect that the one user is within a location that is sensitive based on the contextual information, wherein the sensitivity level is determined accordingly and the one or more privacy policies are configured to prevent sharing of the location;

correlate the contextual information with the brain wave data;

process of the brain wave data to determine sensitivity information of the at least one user to the at least one object, the sensitivity information selected from a combination of a thought process, an emotional state, and a reaction to a specific object of the at least one user;

categorize the identified object data based, at least in part, on the sensitivity information;

cross-reference the identified object data with capabilities of a plurality of applications to determine relevancy of the identified object data for the plurality of applications for selectively triggering one or more of the plurality of applications;

determine a sensitivity level based on the sensitivity information and on the correlation of the contextual information with the brain wave data;

configure one or more privacy policies, which are applied to corresponding one or more of the plurality of applications, of the apparatus based, at least in part, on the sensitivity level; and enforce protective actions for the identified object data based, at least in part, on at least one of the one of the or more privacy policies and the categorization of the identified object data, wherein one or more parameters for the protective actions is based, at least in part, on application capabilities, application trustworthiness, application functionality, or a combination thereof.

7. An apparatus of claim 6, wherein the apparatus is further caused to:

block, allow accessibility with reduced frequency, or a combination thereof for at least one application executing on at least one device based, at least in part, on the one or more privacy policies.

8. An apparatus of claim 6, wherein the determination of the sensitivity level is further based, at least in part, on temporal information, real-time information, or a combination thereof.

9. An apparatus of claim 6, wherein the apparatus is further caused to:

determine accuracy of the sensitivity information by causing, at least in part, multiple processing of the identified object data, determining semantic information associated with the identified object data, integrating emotional state recognition systems, or a combination thereof.

10. An apparatus of claim 9, wherein the apparatus is further caused to:

updating the one or more privacy policies based, at least in part, on an analysis of the accuracy of sensitivity information.

\* \* \* \* \*